(12) United States Patent
Ma et al.

(10) Patent No.: US 10,686,512 B2
(45) Date of Patent: Jun. 16, 2020

(54) ADAPTIVE TRANSMISSION SYSTEMS AND METHODS

(71) Applicant: APPLE INC., Cupertino, CA (US)

(72) Inventors: Jianglei Ma, Kanata (CA); Ming Jia, Ottawa (CA); Jianming Wu, Kanata (CA); Peiying Zhu, Kanata (CA); Wen Tong, Ottawa (CA); Evelyne Le Strat, Paris (FR); Sarah Boumendil, Boulogne-Billancourt (FR); Moussa Abdi, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/796,071

(22) Filed: Oct. 27, 2017

(65) Prior Publication Data

US 2018/0069615 A1   Mar. 8, 2018

Related U.S. Application Data

(63) Continuation of application No. 12/267,736, filed as application No. PCT/CA2007/000644 on Apr. 19, 2007, now Pat. No. 9,806,785.

(60) Provisional application No. 60/795,685, filed on Apr. 28, 2006.

(51) Int. Cl.
*H04B 7/06* (2006.01)
*H04B 7/0452* (2017.01)

(52) U.S. Cl.
CPC ........... *H04B 7/0689* (2013.01); *H04B 7/068* (2013.01); *H04B 7/0697* (2013.01); *H04B 7/0452* (2013.01); *H04B 7/061* (2013.01)

(58) Field of Classification Search
CPC ..... H04B 7/0689; H04B 7/068; H04B 7/0697
See application file for complete search history.

(56) References Cited

U.S. PATENT DOCUMENTS

| | | | |
|---|---|---|---|
| 2004/0082356 A1* | 4/2004 | Walton | H04B 7/022 455/522 |
| 2005/0276317 A1* | 12/2005 | Jeong | H04B 7/0689 375/213 |
| 2006/0009168 A1* | 1/2006 | Khan | H04B 7/0613 455/101 |

* cited by examiner

*Primary Examiner* — Siming Liu
(74) *Attorney, Agent, or Firm* — Fay Kaplun & Marcin, LLP

(57) ABSTRACT

Spatial multiplexing and transmit diversity can improve the capacity of a wireless communication system. The system and method adapts communication schemes for communication systems with multiple antennas utilizing at least two transmission modes. The at least two transmission modes can, but are not necessarily, used for uplink communications. The two transmission modes may be chosen from the group consisting of a single antenna mode, a diversity mode a spatial multiplexed mode and a mixed diversity and spatial multiplexed mode. The at least two transmission modes may involve adaptation among multiple transmitters. At least one receiver may indicate a transmission mode to be used by a transmitter for a subsequent transmission. A transmitter may determine a transmission mode to be used for a subsequent transmission. The transmission mode can be based on channel sounding.

20 Claims, 14 Drawing Sheets

First transmission

Re-transmission (2$^{nd}$, 3$^{rd}$, ...)

$S_i$, i=1...n   Modulated symbols, where n is layer number
m   Transmit antenna number

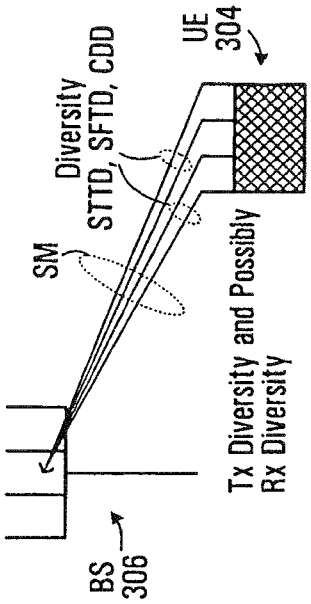
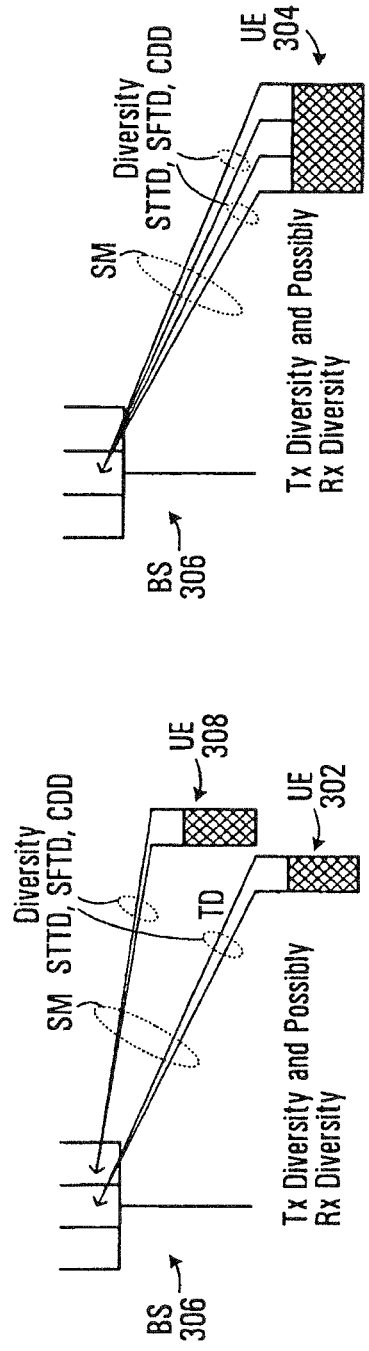
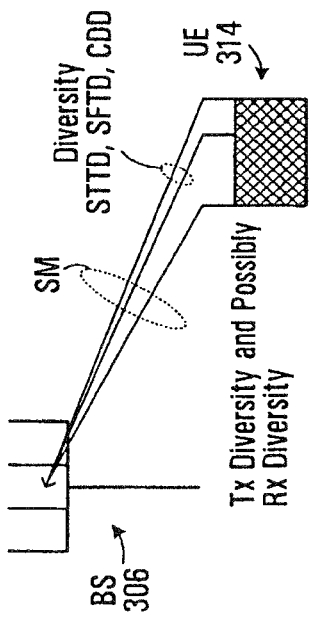

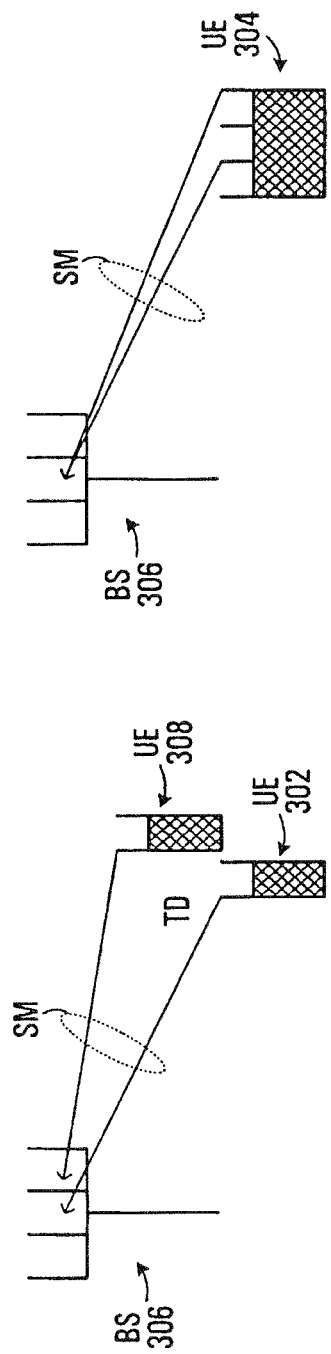
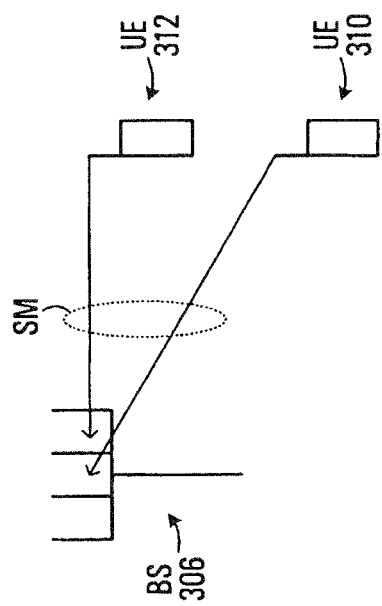
FIG. 3D
FIG. 3E
FIG. 3F

First transmission

Re-transmission (2$^{nd}$, 3$^{rd}$, ...)

$S_i, i=1...n$   Modulated symbols, where n is layer number
m   Transmit antenna number

ADAPTIVE TRANSMISSION SYSTEMS AND METHODS

CROSS-REFERENCE TO RELATED APPLICATIONS

This application claims the benefit of U.S. provisional patent application Ser. No. 60/795,685, filed on Apr. 28, 2006, the entire contents of which is hereby incorporated herein by reference.

FIELD OF THE INVENTION

The present inventions relate to wireless communication systems with multiple antennas. More specifically, the present invention relates to adaptive communication schemes for wireless communication systems with multiple antennas.

BACKGROUND

Known wireless communications schemes may involve the use of a single antenna or multiple antennas on a transmitter and/or receiver.

A multiple input, multiple output (MIMO) wireless communication system has multiple communication channels that are used between a plurality of antennas at a transmitter and a receiver. Accordingly, in a MIMO system a transmitting device will have N transmit antennas, and the receiving device will have M receive antennas. Space-time coding controls what data is transmitted from each of the N transmit antennas. A space-time encoding function at the transmitter processes data to be transmitted and creates unique information to transmit from the N transmit antennas. Each of the M receive antennas will receive signals transmitted from each of the N transmit antennas. A space-time decoding function at the receiving device will combine the information sent from the N transmit antennas to recover the data.

As will be apparent to one of ordinary skill in the art wireless communications, coverage can be improved by employing different transmit and/or receive diversity schemes. By contrast, system capacity can be improved by using spatial multiplexing. One way to employ diversity and/or spatial multiplexing for uplink communications is to use virtual MIMO techniques—see U.S. patent application Ser. No. 10/321,999; publication #2004-0114618. In systems employing virtual MIMO, multiple mobile stations cooperatively transmit the data of a single mobile station so as to appear as a MIMO transmission. For example, two mobile stations with one antenna each can transmit one of the mobile stations data. A two antenna base station could then receive the two signals and process them using MIMO techniques.

Transmit diversity schemes such as space-time/frequency encoding can be implemented using space time/frequency transmitter diversity (STTD/SFTD). STTD/SFTD encodes the same data in different formats for transmission from the different transmit antennas. Thus, the same data is transmitted in different formats from each of the N transmit antennas. In such a system, different transmitting antennas deliver the same information content within consecutive symbol duration or sub-carriers so that time diversity may be exploited. Usually, coverage area can be improved through the use of the transmit diversity.

Receiver diversity can be achieved by using multiple receiver antennas. The objective is to capture multiple independent (or nearly independent) signals at a receiver and combine them in an optimal manner.

Spatial multiplexing increases the capacity of a MIMO link by transmitting independent data streams in the same time slot and frequency band simultaneously from each transmit antenna, and differentiating multiple data streams at the receiver using channel information about each propagation path. Accordingly, a symbol sequence is divided into a plurality of sequences and transmitted to different transmit antennas. A different symbol is used for each transmit antenna. For example, if three antennas are used at a transmitter and a receiver, the symbol sequence is split into three independent sequences and applied to the three different antennas and transmitted. The application of spatial multiplexing can enhance data throughput and therefore system capacity.

Spatial multiplexing, transmit diversity and receive diversity can improve the capacity of a wireless communication system.

SUMMARY OF THE INVENTION

In one embodiment, the system and method described herein adapts communication schemes for communication systems with at least one transmit antenna and more than one receive antennas.

In some embodiments, the communication systems and methods described herein utilize at least two transmission modes. The at least two transmission modes can, but are not necessarily, used for uplink communications. The at least two transmission modes may be chosen from the group consisting of a single antenna mode, a transmit diversity mode, a receiver diversity mode, a spatial multiplexed mode and a mixed diversity and spatial multiplexed mode. The at least two transmission modes may involve adaptation among multiple transmitters.

In some embodiments, the at least two transmission modes are used by at least two transmitters. In this case, the at least two transmission modes may be chosen from the group consisting of a single-user based spatial multiplexed mode, a multi-user spatial multiplexed mode, a single-user based diversity mode, and a multi-user diversity mode.

In some embodiments, a receiver indicates a transmission mode to be used by a transmitter for a subsequent transmission. In some embodiments, a transmitter determines a transmission mode to be used for a subsequent transmission. The transmission mode can be based on channel sounding.

In some embodiments, a degree of transmit and/or receive diversity and/or spatial multiplexing can be adaptively supported for uplink communications. The degree of diversity and/or spatial multiplexing can be adaptively supported based on a number of transmit antennas and/or on a number of receive antennas and/or channel condition information.

In some embodiments, a degree of diversity and/or spatial multiplexing can be adaptively supported for uplink communications wherein said uplink communications include single-user MIMO communications, and multi-user MIMO communications.

In some embodiments, at least two transmission modes are utilized to enhance the coverage of a cell edge transmitter using transmitter and/or receiver diversity. In some embodiments, at least two transmission modes are utilized to improve throughput of transmitters having good channel conditions using spatial multiplexing.

In some embodiments, at least two Hybrid Automatic Repeat Request (HARQ) modes are utilized, the at least two HARQ modes being chosen from the group consisting of incremental redundancy (IR) HARQ, chase combining (CC) HARQ and re-mapping HARQ schemes.

In accordance with one broad aspect, there is provided an adaptive transmission method in a wireless communication system, the wireless communication system having one or more transmitters and at least one receiver, each transmitter having one or more antennas for transmitting data on a channel to the receiver, the at least one receiver having one or more receive antennas for receiving the data on the channel, the method comprising: transmitting data from the one or more transmitters to the at least one receiver on the channel according to a first transmission mode for a first time period; and transmitting data from the one or more transmitters to the at least one receiver on the channel according to a second transmission mode for a second time period.

In accordance with another broad aspect, there is provided a transmitter comprising: one or more antennas; transmission circuitry operable to: transmit data from the one or more antennas on a channel according to a first transmission mode for a first time period; and transmit data from the one or more transmitters on a channel according to a second transmission mode for a second time period.

Other aspects and features of the system and method described herein will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which:

FIG. 3A is a schematic diagram of a wireless communications environment according to one embodiment;

FIG. 3B is a schematic diagram of a wireless communications environment according to one embodiment;

FIG. 3C is a schematic diagram of a wireless communications environment according to one embodiment;

FIG. 3D is a schematic diagram of a wireless communications environment according to one embodiment;

FIG. 3E is a schematic diagram of a wireless communications environment according to one embodiment;

FIG. 3F is a schematic diagram of a wireless communications environment according to one embodiment;

DETAILED DESCRIPTION OF THE PREFERRED EMBODIMENTS

In FIGS. 1A-5D, one or more transmitter antennae and one or more receiver antennae allow the wireless communication systems shown to include varying degrees of spatial multiplexing, transmit diversity, receive diversity, and/or none of these communication modes.

Figure 1A:
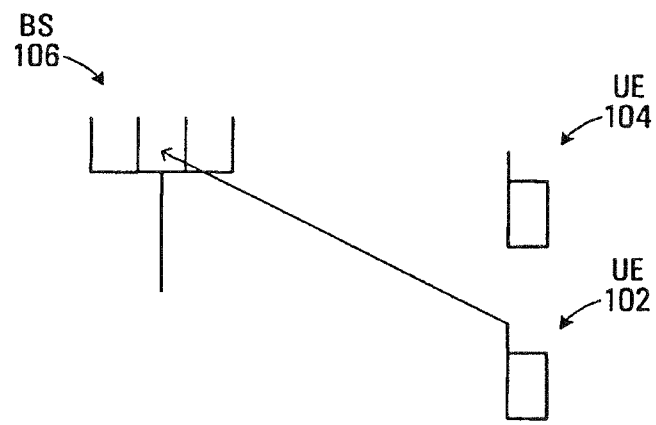
FIG. 1A is a schematic diagram of a wireless communications environment according to one embodiment.
Figure 1B:
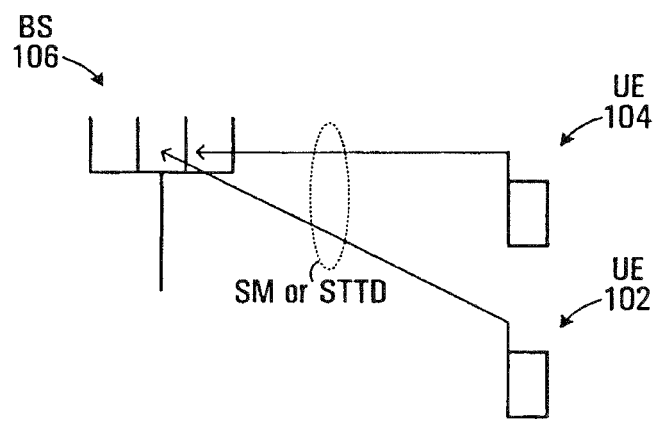
FIG. 1B is a schematic diagram of a wireless communications environment according to one embodiment.

FIGS. 1A and 1B are schematic diagrams of a wireless communications environment according to one embodiment. In this embodiment, all mobile stations have a single transmit antenna.

In the wireless communication system of FIGS. 1A and 1B, a base station (BS) 106 which provides communication services for a coverage area or cell transmits and receives communication signals to and from a plurality of User Equipment terminals (UE) 102, 104. UE 102 and UE 104 are also commonly referred to in the art as mobile stations, user terminals, and communication devices, for example. UE 102 and UE 104 have single transmit antennas. Each of UE 102 and UE 104 include a space time transmitter diversity (STTD) encoder and a spatial multiplexing (SM) encoder (not shown).

In FIG. 1A, UE 102 is shown in uplink communication with BS 106 in single antenna mode. UE 104 is not transmitting data to BS 106 in this instance.

In FIG. 1B and in any other applicable figure which follows, STTD/SFTD and SM are the abbreviations of Space-Time Transmitter Diversity/Space-frequency Transmitter Diversity and Spatial Multiplexing respectively. In the description which follows, M is the number of Receive antennas at the receiver, which in FIGS. 1A and 1B is represented by BS 106. In this embodiment as shown in FIGS. 1A and 1B, M=4. Rank adaptation can only be realized when M>=2 because the decoding of the two steams (either from the same UE or different UE) requires two receive antennas.

In FIG. 1B, multiple antennas are used on both sides of the wireless link, thus creating a MIMO communication system. More specifically, UE 102 and UE 104 are both engaged in uplink communications with BS 106 using cooperative MIMO, i.e. multiple single Tx antenna mobile stations cooperatively transmitting so as to appear as a MIMO transmission. Uplink transmissions from UE 102 and UE 104 to BS 106 are transmitted either in accordance with SM or STTD/SFTD depending on the circumstances which are described in more detail below.

In operation, UE 102 and UE 104 may start transmission of data packets with either STTD or SFTD assuming there is a communication between UE 102 and UE 104, or spatial diversity using spatial multiplexing (SM). BS 106 will estimate the channels and decode the data packets.

According to this embodiment, the uplink transmission scheme may be switched between single antenna (1×M), i.e. Rx diversity only and one of:

i. Tx and Rx diversity, (2×M), where information is to be shared between UE 102 and UE 104; or ii. 2×M spatial multiplexing.

The switching between uplink transmission schemes can be performed by a Node-B scheduler at BS 106 (not shown). The Node-B scheduler manages both uplink and downlink traffic based on:

i. Channel Quality Indicator (CQI) or Effective CQI;
ii. Traffic type;
iii. UE available Tx power; or
iv. Total uplink traffic load in the system.

The adaptation of a transmission mode between the modes illustrated in FIGS. 1A and 1B can be performed by the Node-B scheduler on a periodic basis so that a preferred transmission mode is selected at any given time. Further details regarding possible adaptation procedures which can be employed are described below.

In another embodiment which is illustrated in FIGS. 2A-5D, the method and system of the present invention will be referred to as the rank adaptation of UL MIMO transmission. In this embodiment, a virtual antenna group consisting of N antennas is created, where N is the maximum possible rank. The N antennas in the virtual antenna group can be from different UEs. According to the method and system of this embodiment, rank adaptation can be performed (e.g. from a rank-1 communication system to a rank-2 communication system, and so on up to a rank N communication system) based on channel condition, traffic type, the number of Tx antenna and the number of BS Tx antenna much in the same way as was described in connection with FIGS. 1A and 1B.

Figure 2A:
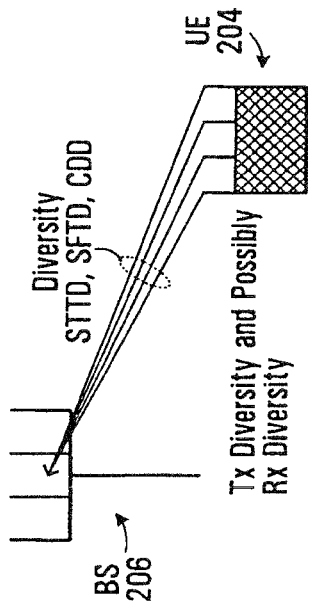
FIG. 2A is a schematic diagram of a wireless communications environment according to one embodiment.
Figure 2B:
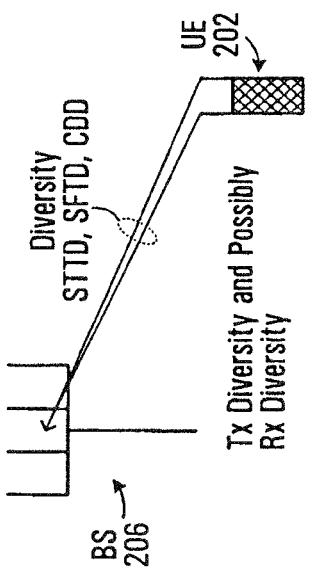
FIG. 2B is a schematic diagram of a wireless communications environment according to one embodiment.

FIGS. 2A and 2B are schematic diagrams of a wireless communications environment according to an aspect of this embodiment. In this embodiment, the UEs can have both single and multiple antennas, though in FIGS. 2A and 2B UE 202 and UE 204 are both shown having more than one antenna each.

Essentially, the "rank" refers to the total number of independent communication streams of data between UEs and a BS in a communication system. FIGS. 2A and 2B are examples of rank-1 communication systems. Rank-1 communication systems involve pure transmit diversity and possibly receive diversity, as discussed in more detail below. FIGS. 2A and 2B are merely illustrative examples of rank-1 communication systems and the system and method of the present invention is in no way so limited.

In FIG. 2A, UE 202, which has two Tx antennas, is shown in uplink communications with BS 206. Transmit diversity may be based on any one of STTD, Space-frequency transmit diversity (SFTD), and Cyclic Delay Diversity (CDD). Rank-1 transmission mode may possibly include Rx diversity as well. As can be seen in FIG. 2A, there is only one independent data stream between UE 202 and BS 206.

In FIG. 2B, UE 204, which has four Tx antennas, is shown in uplink communications with BS 206. In this instance, there is also transmit diversity based on any one of STTD, Space-frequency transmit diversity (SFTD), and Cyclic Delay Diversity (CDD). It may include Rx diversity as well. As can be seen in FIG. 2B, there is only one independent data stream of data between UE 204 and BS 206.

FIGS. 2A and 2B are examples of single-user MIMO and single-user based diversity mode.

FIGS. 3A-3F are schematic diagrams of a wireless communications environment according to one embodiment. More particularly, FIGS. 3A-3F are examples of rank-2 communication systems, i.e. where there are two independent data streams of data between the UEs and the BS. Rank-2 communication systems involve combining diversity and spatial multiplexing, and possibly receive diversity. FIGS. 3A-3F are merely illustrative examples of rank-2 communication systems and the system and method of the present invention is in no way so limited.

In FIG. 3A, UE 302, which has two Tx antennas, is shown in uplink communications with BS 306. Similarly, UE 308, which has two Tx antennas, is shown in uplink communications with BS 306. In this instance, there is transmit diversity on a first stream of data from UE 302 to BS 306. There is also transmit diversity on a second stream of data from UE 308 to BS 306. In this instance, there is also spatial multiplexing on both streams of data. Depending on the configuration of BS 306, there may possibly be Rx diversity as well. FIG. 3A is an example of multi-user based diversity mode and multi-user spatial multiplexed mode.

In FIG. 3B, UE 304, which has four Tx antennas, is shown in uplink communications with BS 306. In this instance, there is transmit diversity on a first stream of data from two of the four Tx antennas. There is also transmit diversity on a second stream of data on the remaining two Tx antennas. In this instance, there is also spatial multiplexing on both streams of data. Depending on the configuration of BS 306, there may possibly be Rx diversity as well. FIG. 3B is an example of single-user based combined diversity mode and single-user based spatial multiplexed mode.

In FIG. 3C, UE 314, which has three Tx antennas, is shown in uplink communications with BS 306. In this instance, there is transmit diversity on a first stream of data from two of the three Tx antennas. There is also a second stream of data from the remaining Tx antenna. In this instance, there is also spatial multiplexing on both streams of data. There may also be Rx diversity as well. FIG. 3C is an example of single-user based combined diversity mode and single-user based spatial multiplexed mode.

In FIG. 3D, UE 302, which has two Tx antennas, is shown in uplink communications with BS 306 via only one Tx antenna. Similarly, UE 308, which has two Tx antennas, is shown in uplink communications with BS 306 via only one Tx antenna. In this instance, there is no transmit diversity on the two streams of data. However, there is spatial multiplexing on the two streams of data. FIG. 3D is an example of multi-user based spatial multiplexed mode.

In FIG. 3E, UE 304, which has four Tx antennas, is shown in uplink communications with BS 306. UE 304 is transmitting via only two of its four antennas, with each antenna transmitting a separate stream of data. In this instance, there is no transmit diversity on the two streams of data. However, there is spatial multiplexing on the two streams of data. FIG. 3E is an example of single-user based spatial multiplexed mode. As will be discussed in more detail below, the single-user based rank adaptation can also be realized by a certain type of pre-processing.

In FIG. 3F, UE 310, which has one Tx antenna, is shown in uplink communications with BS 306. Similarly, UE 312, which has one Tx antenna, is shown in uplink communications with BS 306. In this instance, there is no transmit diversity on the two streams of data. However, there is spatial multiplexing on the two streams of data. FIG. 3F is an example of multi-user based spatial multiplexed mode.

Figure 4A:
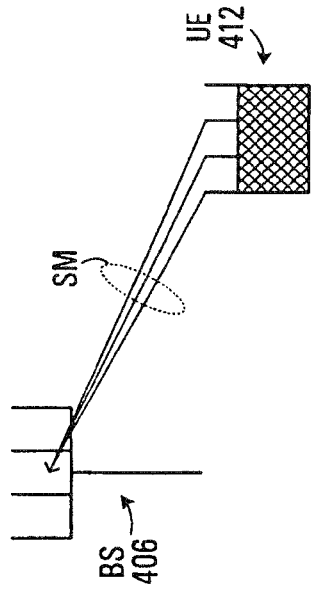
FIG. 4A is a schematic diagram of a wireless communications environment according to one embodiment.
Figure 4B:
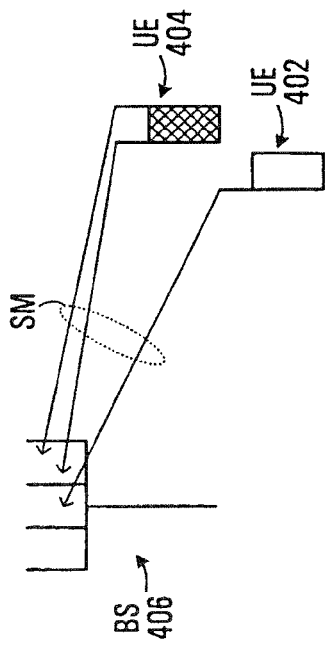
FIG. 4B is a schematic diagram of a wireless communications environment according to one embodiment.
Figure 4C:
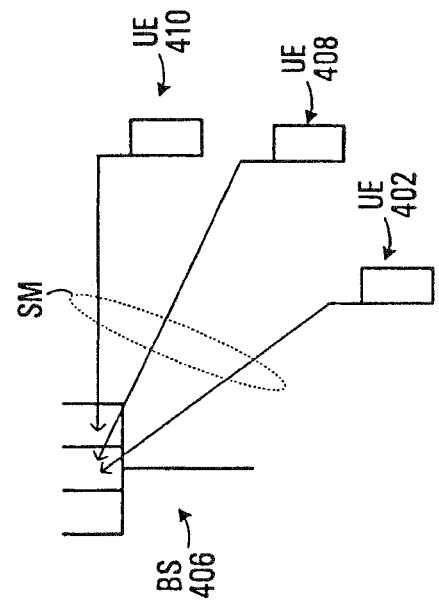
FIG. 4C is a schematic diagram of a wireless communications environment according to one embodiment.

FIGS. 4A-4C are schematic diagrams of a wireless communications environment according to one embodiment. More particularly, FIGS. 4A-4C are examples of rank-3 communication systems, i.e. where there are three independent data streams of data between the UEs and the BS. Rank-3 communication systems may be applied to antennas from a single UE or multiple UEs. Rank-3 communication systems involve combining diversity and spatial multiplexing, and possibly receive diversity. FIGS. 4A-4C are merely illustrative examples of rank-3 communication systems and the system and method of the present invention is in no way so limited.

In FIG. 4A, UE 402, which has one Tx antenna, is shown in uplink communications with BS 406. As such, there is one stream of data from UE 402 to BS 406. Similarly, UE 404, which has two Tx antennas, is shown in uplink communications with BS 406. As such, there are two streams of data from UE 404 to BS 406. In this instance, there is no transmit diversity on the three streams of data. However, there is spatial multiplexing on the three streams. FIG. 4A is an example of multi-user based spatial multiplexed mode.

In FIG. 4B, UE 412, which has four Tx antennas, is shown in uplink communications with BS 406, though only three of its antennas are active. As such, there are only three streams of data from UE 412 to BS 406. In this instance, there is no transmit diversity on the three streams of data. However, there is spatial multiplexing on the three streams. FIG. 4B is an example of single-user based spatial multiplexed mode.

In FIG. 4C, UE 402, which has one Tx antenna, is shown in uplink communications with BS 406. As such, there is one stream of data from UE 402 to BS 406. Similarly, UE 408 and UE 410, which also have one Tx antennas each, are also shown in uplink communication with BS 406. As such, there are three streams of data from UEs 402, 408, 410 to BS 406. In this instance, there is no transmit diversity on the three streams of data. However, there is spatial multiplexing on the three streams. FIG. 4C is an example of multi-user based spatial multiplexed mode.

FIGS. 5A-5D are schematic diagrams of a wireless communications environment according to one embodiment. More particularly, FIGS. 5A-5D are examples of rank-4 communication systems, i.e. where there are four independent data streams of data between the UEs and the BS. Rank-4 communication systems may be applied to antennas from a single UE or multiple UEs. Rank-4 communication systems involve spatial multiplexing alone in these examples where the maximum rank is 4. FIGS. 5A-5D are merely illustrative examples of rank-4 communication systems and the system and method of the present invention is in no way so limited.

Figure 5B:
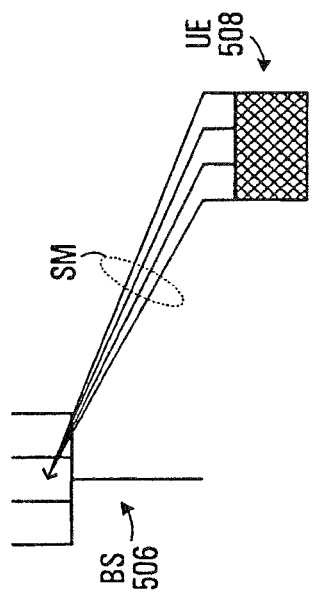
FIG. 5B is a schematic diagram of a wireless communications environment according to one embodiment.
Figure 5D:
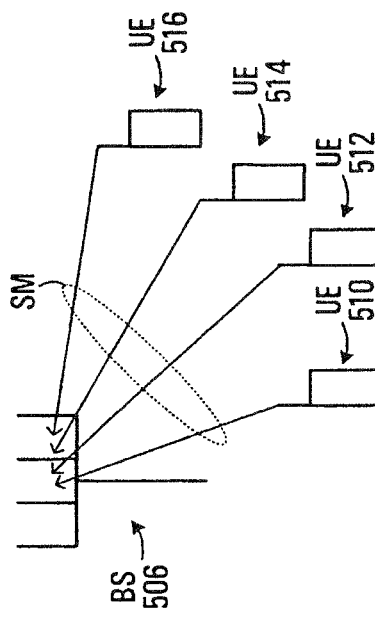
FIG. 5D is a schematic diagram of a wireless communications environment according to one embodiment.
Figure 5A:
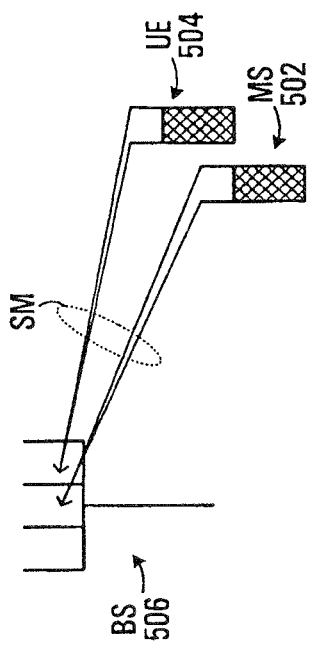
FIG. 5A is a schematic diagram of a wireless communications environment according to one embodiment.

In FIG. 5A, UE 502, which has two Tx antennas, is shown in uplink communications with BS 506. As such, there are two streams of data from UE 502 to BS 506. Similarly, UE 504, which has two Tx antennas, is shown in uplink communications with BS 506. As such, there are two streams of data from UE 504 to BS 506. In this instance, there is no transmit diversity on the four streams of data. However, there is spatial multiplexing on the four streams.

In FIG. 5B, UE 508, which has four Tx antennas, is shown in uplink communications with BS 506. All four of its antennas are active. As such, there are four streams of data from UE 508 to BS 506. In this instance, there is no transmit diversity on the four streams of data. However, there is spatial multiplexing on the four streams.

Figure 5C:
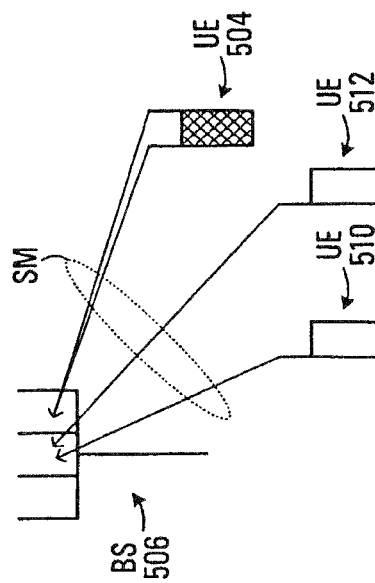
FIG. 5C is a schematic diagram of a wireless communications environment according to one embodiment.

In FIG. 5C, UE 510, which has one Tx antenna, is shown in uplink communications with BS 506. Similarly, UE 512, which also has one Tx antenna, is also shown in uplink communications with BS 506. UE 504, which has two Tx antennas, is also shown in uplink communications with BS 506. As such, there are a total of four streams of data from the UEs to BS 506. In this instance, there is no transmit diversity on the four streams of data. However, there is spatial multiplexing on the four streams.

In FIG. 5D, UE 510, which has one Tx antenna, is shown in uplink communications with BS 506. Similarly, UE 512, which also has one Tx antenna, is also shown in uplink communications with BS 506. UE 514 and 516, which both have one antenna each, are also in uplink communications with BS 506. As such, there are a total of four streams of data from the UEs to BS 506. In this instance, there is no transmit diversity on the four streams of data. However, there is spatial multiplexing on the four streams.

FIGS. 5A, 5C and 5D are examples of multi-user based spatial multiplexed mode. FIG. 5B is an example of single-user based spatial multiplexed mode.

Though only one receiver is illustrated in FIGS. 1A-5D, of course more than one receiver can also be applied to decode the various transmission modes illustrated and discussed above.

The single-user based rank adaptation can also be realized by a certain type of pre-processing such as by applying different pre-coding vector/matrix.

In one embodiment, an orthogonal scheduling scheme may be used by a Node-B scheduler at a BS to select antennas for spatial multiplexing antenna grouping, examples of which are shown in FIGS. 2A-2B, 3A-3F, 4A-4C, and 5A-5D described above. See U.S. patent application Ser. No. 11/336,371 filed Jan. 20, 2006.

In another embodiment, orthogonal pilot channels may be used to facilitate MIMO de-coding at the base station. The number of the required orthogonal pilot channels may be determined by the antenna number in the virtual antenna group. The orthogonal pilot channels between different Tx antennas may be realized by Frequency Division Multiplexing (FDM), Time Division Multiplexing (TDM) and Code Division Multiplexing (CDM) separation.

While embodiments are shown in the context of uplink communications, the systems and methods described herein are not limited in this regard and equally applicable to downlink communication.

In accordance with one embodiment of the invention, an adaptation procedure may be provided by the following. In this case, reference is being made to FIG. 3B, though this adaptation procedure can be used with appropriate modifications for any of the various transmission modes illustrated in the figures mentioned above.

UE 304 may send a bandwidth request to BS 306 via a Random Access Channel (RACH Channel) or other UL channel. At the same time, UE 304 may report any one or more of buffer status, traffic type, available transmit power, Tx antenna capability to Node-B through UL control signaling channel. Since the performance of spatial multiplexing and transmit diversity can be substantially affected depending on the condition of a MIMO channel, a CQI metric may be used to select the optimal MIMO transmission mode.

BS 306 may then measure the CQI. A CQI metric measurement module at BS 306 (not shown) processes received pilot or data from UE 304 and having regard to knowledge of what the transmitted pilot was, produces a CQI metric. CQI metrics are well known and may for example include CINR (carrier to interference and noise ratio), and the rank of the MIMO channel. Those skilled in the art will appreciate that a CQI metric measurement may be performed by a digital signal processor (DSP) or a general-purpose processor adapted to execute signal processing software, for example. Various techniques for determining such metric measurements will be apparent to those skilled in the art. An Effective CQI containing channel matrix condition may also be used by BS 306 if UL channel information may be obtained, for example, from a UE dedicated pilot channel or sounding channel.

BS 306 may then schedule uplink data transmission with different MIMO schemes such as those illustrated in the figures described above. For example, there could be transmit diversity and possibly Rx diversity where UE 304 has a CQI or Effective CQI, for example, below a predetermined threshold. This could also be the case where there a desire not to delay sensitive traffic or when Hybrid Automatic Repeat Request (HARQ) cannot be applied.

For higher rank schemes (i.e. rank 2 through rank 4), the maximum supported rank may be a deployment parameter. BS 306 may select N antennas from more than one UE (see, for example, UE 302 and UE 308 in FIG. 3A) to create a virtual antenna group for each sub-channel assigned for the transmission with higher rank.

If BS 306 is aware of the UL channel information, an orthogonal scheduling method may be applied. If BS 306 is not aware of the UL channel information, BS 306 may select one or more antennas from a group of UEs based on the CQI. BS 306 may further select the rank of MIMO transmission scheme which may be less than or equal to the maximum supported rank based on the effective CQI of the virtual channel matrix of the virtual antenna group.

In accordance with another embodiment of the invention, MIMO mode signaling may be used to indicate the transmission mode in a MIMO communication system. In this embodiment, Node-B signals pilot pattern index and/or MIMO scheme together with other transmission allocation signaling. Additional singling bits may be used as the MIMO mode indicator and pilot pattern indicator. Where there is a single antenna UE: an M bit pilot pattern indicator can be used. Where there is a dual antenna UE: an M bit pilot pattern indicator +1 bit MIMO mode indicator (Tx/Rx diversity or SM) can be used. Where there is a four antenna UE: M bit pilot pattern indicator +2 bit MIMO mode indicator (+2 bits antenna indicator: optional) can be used. In the paragraph above, M=1 for N=2 and M=2 for N=4.

FIGS. 6 to 10 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

Figure 6:
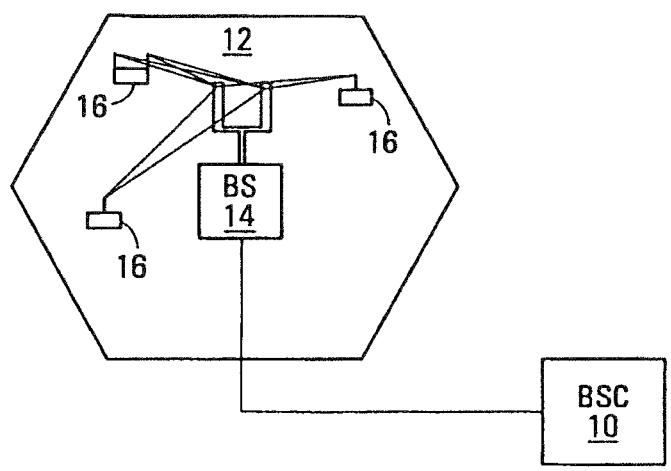
FIG. 6 is a block diagram of a prior art wireless communications environment.

With reference to FIG. 6, a base station controller (BSC) 10 controls wireless communications within multiple cells 12, which are served by corresponding base stations (BS) 14. In general, each base station 14 facilitates communications using OFDM with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 7:
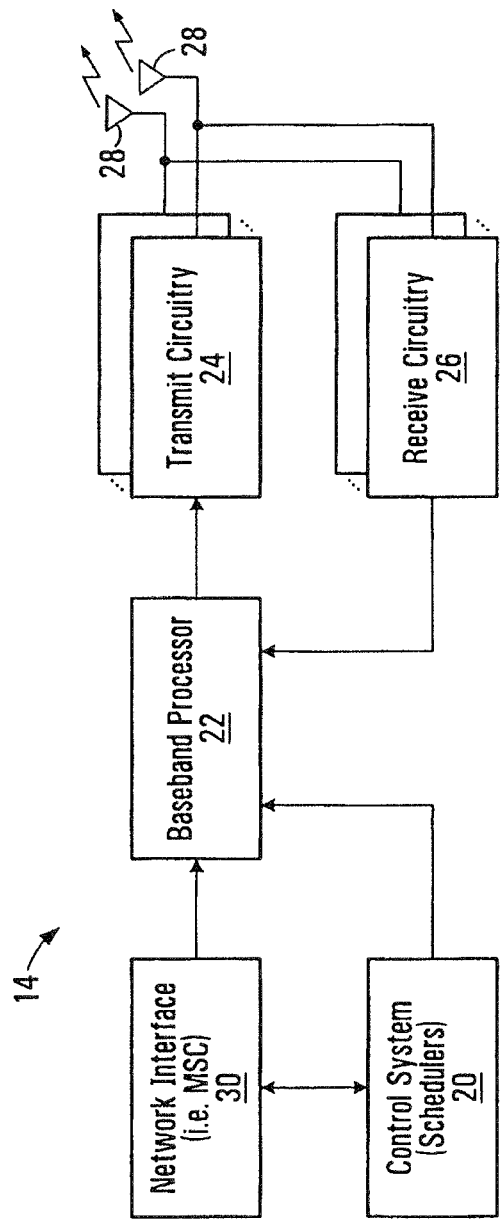
FIG. 7 is a block representation of a prior art base station.

A high level overview of the mobile terminals 16 and base stations 14 of the present invention is provided prior to delving into the structural and functional details of the preferred embodiments. With reference to FIG. 7, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 8). Preferably, a low noise amplifier and a filter (not shown) cooperate to amplify and remove out-of-band interference from the signal for processing. Down conversion and digitization circuitry (not shown) will then down convert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 8:
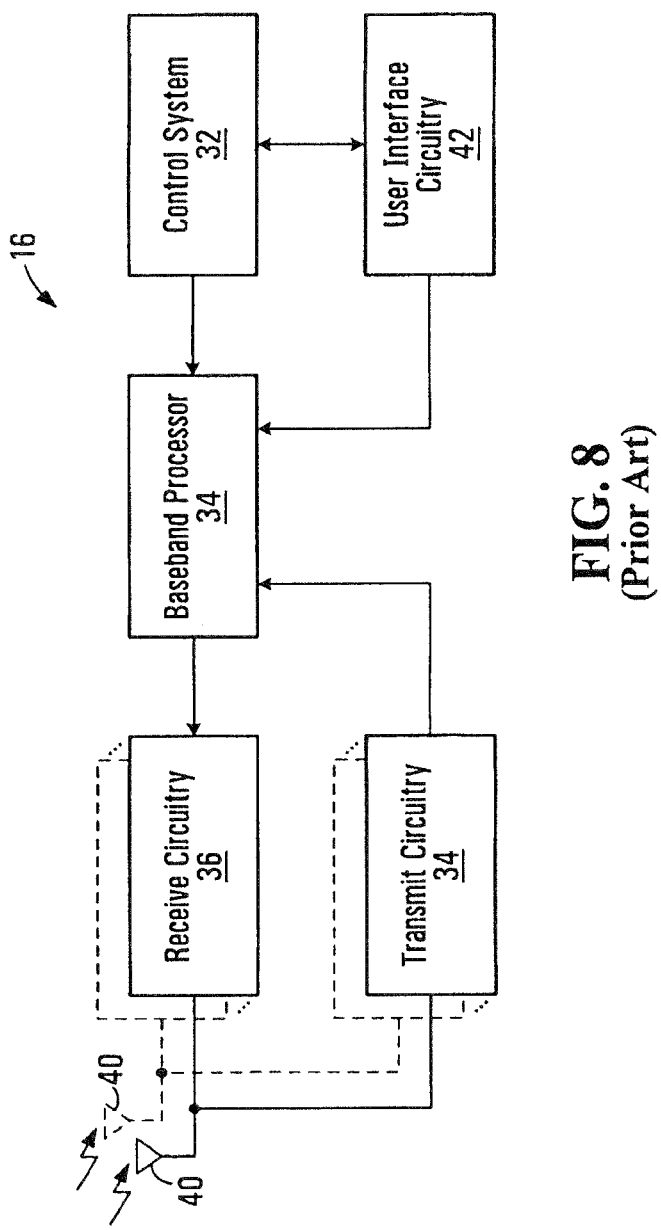
FIG. 8 is a block representation of a prior art mobile terminal.

With reference to FIG. 8, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove out-of-band interference from the signal for processing. Down conversion and digitization circuitry (not shown) will then down convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation requires the performance of an Inverse Fast Fourier Transform (IFFT) on the information to be transmitted. For demodulation, the performance of a Fast Fourier Transform (FFT) on the received signal is required to recover the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In the preferred embodiment, OFDM is used for at least the downlink transmission from the base stations 14 to the mobile terminals 16. Each base station 14 is equipped with n transmit antennas 28, and each mobile terminal 16 is equipped with m receive antennas 40. Notably, the respective antennas can be used for reception and transmission using appropriate duplexers or switches and are so labeled only for clarity.

Figure 9:
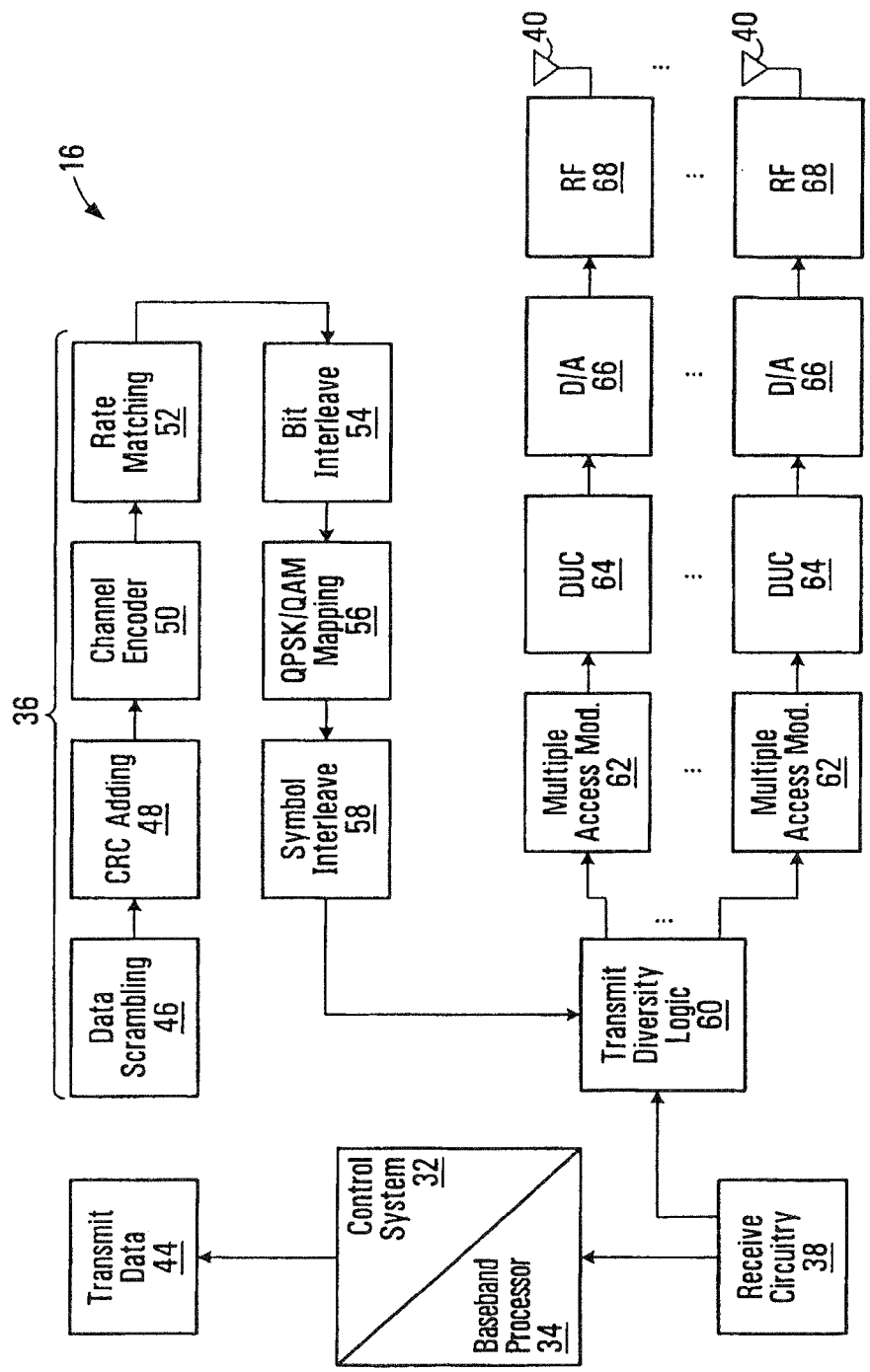
FIG. 9 is a more detailed logical representation of a prior art mobile terminal.

With reference to FIG. 9, a logical OFDM transmission architecture is provided according to one embodiment. Initially, the base station controller 10 will send data to be transmitted to various mobile terminals 16 to the base station 14. The base station 14 may use the CQIs associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide n outputs corresponding to the number of transmit antennas 28 for the base station 14. The control system 20 and/or baseband processor 22 will provide a mapping control signal to control STC encoding. At this point, assume the symbols for the n outputs are representative of the data to be transmitted and capable of being recovered by the mobile terminal 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 10:
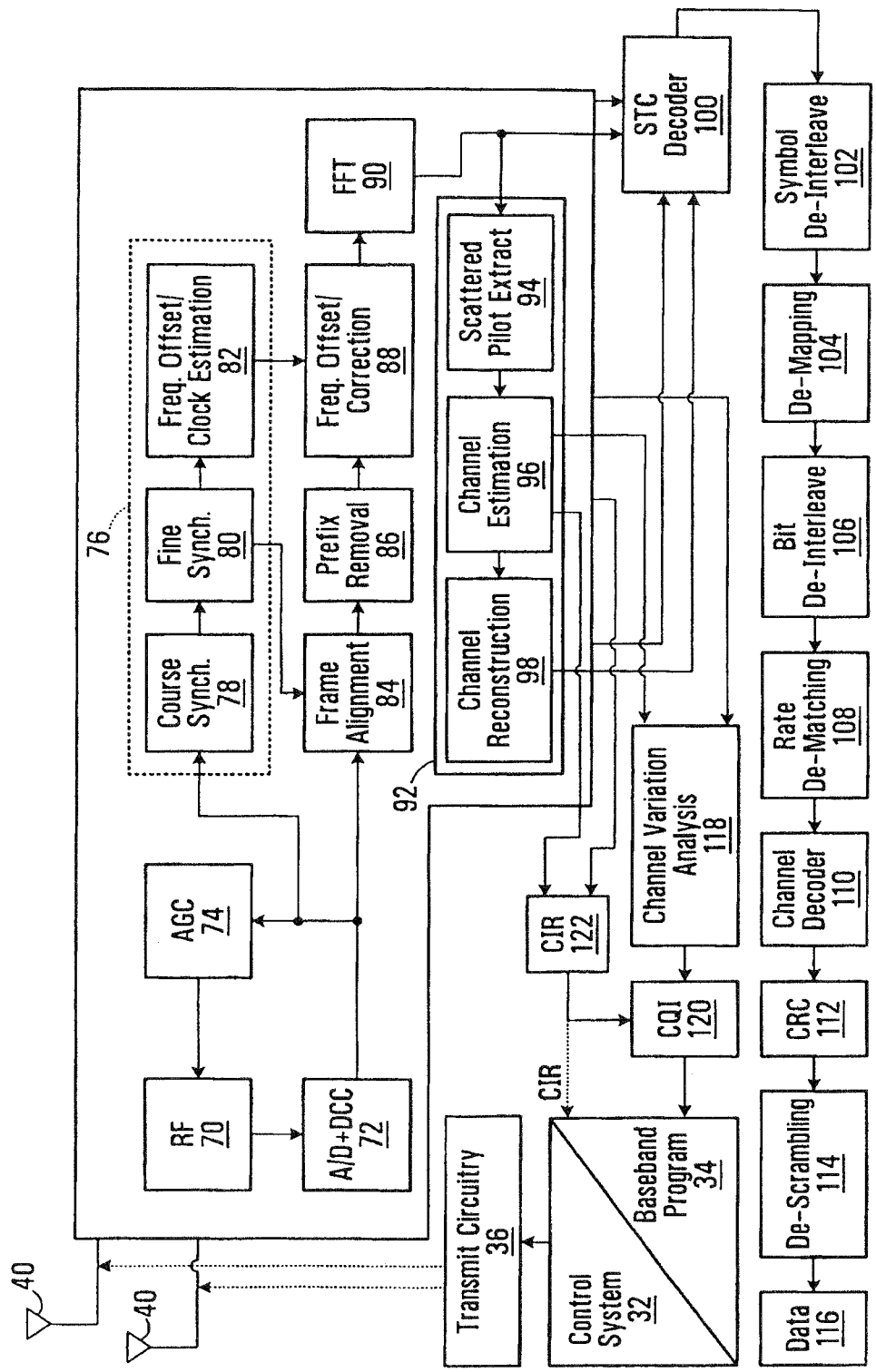
FIG. 10 is a more detailed logical representation of a prior art base station.

Reference is now made to FIG. 10 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency.

Figure 11:
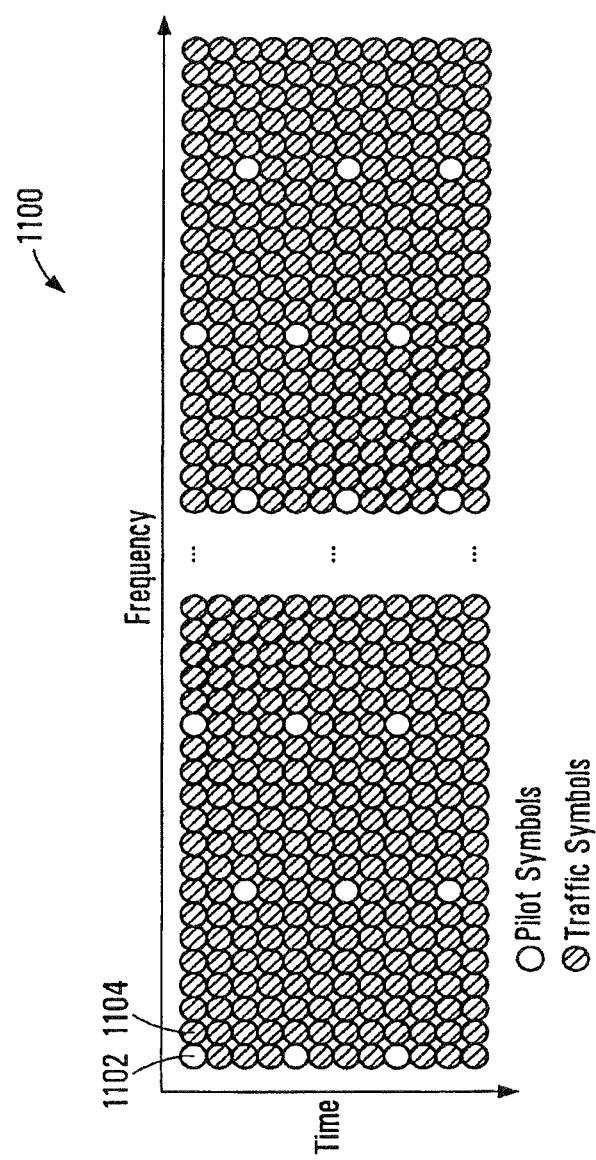
FIG. 11 is a diagram of a scattered pilot pattern.

FIG. 11 illustrates an exemplary scattering of pilot symbols among available sub-carriers over a given time and frequency plot in an OFDM environment. Continuing with FIG. 10, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

Channel estimation in OFDM is usually performed with the aid of pilot symbols. More particularly, at an OFDM transmitter, known pilot symbols are periodically transmitted along with data symbols. The pilot symbols are typically spaced in time and frequency.

The variations in phase and amplitude resulting from propagation across an OFDM channel are referred to as the channel response. The channel response is usually frequency and time dependent. If an OFDM receiver can determine the channel response, the received signal can be corrected to compensate for the channel degradation. The determination of the channel response is called channel estimation. The transmission of known pilot symbols along with data symbols allows the receiver to carry out channel estimation.

When a receiver receives an OFDM signal, the receiver compares the received value of the pilot symbols with the known transmitted value of the pilot symbols to estimate the channel response.

Since the channel response can vary with time and with frequency, the pilot symbols are scattered amongst the data symbols to provide a range of channel responses over time and frequency. The set of frequencies and times at which pilot symbols are inserted is referred to as a pilot pattern. In some cases, the pilot pattern is a diagonal-shaped lattice, either regular or irregular.

In accordance with embodiments of the invention various communication schemes are described. While described in the context of an OFDM air interface, one of ordinary skill in the art will appreciate that the broader inventions are not limited in this regard and are applicable to other air interfaces including CDMA, FDMA, Single Carrier or Multi-carrier.

In another embodiment, at least two HARQ (Hybrid Automatic Repeat Request) modes are utilized. According to this embodiment, the at least two HARQ modes being chosen from the group consisting of incremental redundancy (IR) HARQ, chase combining (CC) HARQ and re-mapping HARQ schemes.

HARQ is a variation of the ARQ error control method, which typically gives better performance than ordinary ARQ, particularly over wireless channels. Two know types of HARQ schemes include:

i. Chase combining: store the incorrectly received coded data blocks at the receiver, and when the retransmitted coded data block is received, the information from both coded data blocks are combined before being fed to the decoder of the error-correction code, which can increase the probability of successful decoding; and ii. Incremental redundancy (IR): in this scheme, different (re)transmissions are coded differently rather than simply repeating the same coded bits as in Chase combining, which typically gives better performance since coding is effectively done across retransmissions.

HARQ can be further classified as synchronous/asynchronous and adaptive and non-adaptive:

i. Synchronous HARQ: retransmission for a certain HARQ process occur at known time instants; No explicit signaling of the HARQ process number is required.

ii. Asynchronous HARQ: retransmission for a certain HARQ process may occur at anytime instants; Explicit signaling of the HARQ process number is required.

iii. Adaptive: the transmitter may change some or all of the transmission attributes (e.g. modulation and coding) used in each retransmission as compared to the initial transmissions.
iv. Non-adaptive: the change, if any, in the transmission attributes for the retransmission are known to both the transmitter and receiver at the time of the initial transmission.

Space time Codes (STC) based ARQ can be considered as a special case of chase combining HARQ. STC-HARQ is a variation of chase combining where a block code structure is applied to a retransmission to obtain additional transmit diversity. When generalized STC decoder is used, STC HARQ may outperform chase combining HARQ:
i. STC gain when the speed is less than 100 km/h;
ii. Similar performance when speed is larger than 100 km/h.

STC HARQ may be applied in both synchronous and asynchronous operations. It exploits the spatial diversity and may outperform chase combining and IR in the scenario where the channel does not change significantly during the retransmission duration. As performance degradation may be experienced be very high-speed UE's (e.g. >100 km/h). For a fuller description of STC based ARQ see U.S. patent application Ser. No. 10/251,935, publication #2004-0057530.

In accordance with an embodiment of the invention an adaptive HARQ scheme, which can optimize HARQ performance is presented. According to this embodiment IR/chase combining HARQ for high speed UE and STC-HARQ for low speed UE. In MIMO scenario, channel combining can be implemented with re-transmission symbols swapping across antennas. This may provide extra spatial diversity gain. In addition, diversity schemes such as STTD, SFTD and CDD may be used.

According to an embodiment of the invention, for STC HARQ, the same channel resource allocation is used for retransmissions.

According to an embodiment of the invention, for STC HARQ, the re-transmission's transmission attributes (e.g. modulation and coding) are fixed between two transmissions (i.e. a transmission and a re-transmission).

In accordance with an embodiment of the invention HARQ mode switching may be used to provide optimal HARQ performance.

In accordance with an embodiment of the invention HARQ mode switching may be employed such that no additional HARQ mode signaling is required. Of course, additional signaling could be used if so desired without departing from the broader scope of the invention claimed.

In accordance with an embodiment of the invention HARQ mode switching may be based on the transmission type: diversity transmission and sub-band transmission. Diversity transmission may be applied to high speed UE to exploit the frequency diversity. Sub-band transmission may be applied by the nomadic and low speed UE to exploit the multi-UE diversity.

According to an embodiment one may assign the same channel resource to retransmission when multi-UE diversity is exploited by retransmission. ARQ mode switching criteria may include: Diversity transmission: IR/chase combining and Sub-band: STC.

In accordance with an embodiment of the invention HARQ mode switching may be based on MIMO mode selection, for example:
i. Open-loop MIMO: may use IR or CC
ii. Closed-loop MIMO: may use STC or antenna The same procedure may be applied by retransmission. May switch to IR/chase combining if a pre-coding matrix/vector changes.

Figure 12:
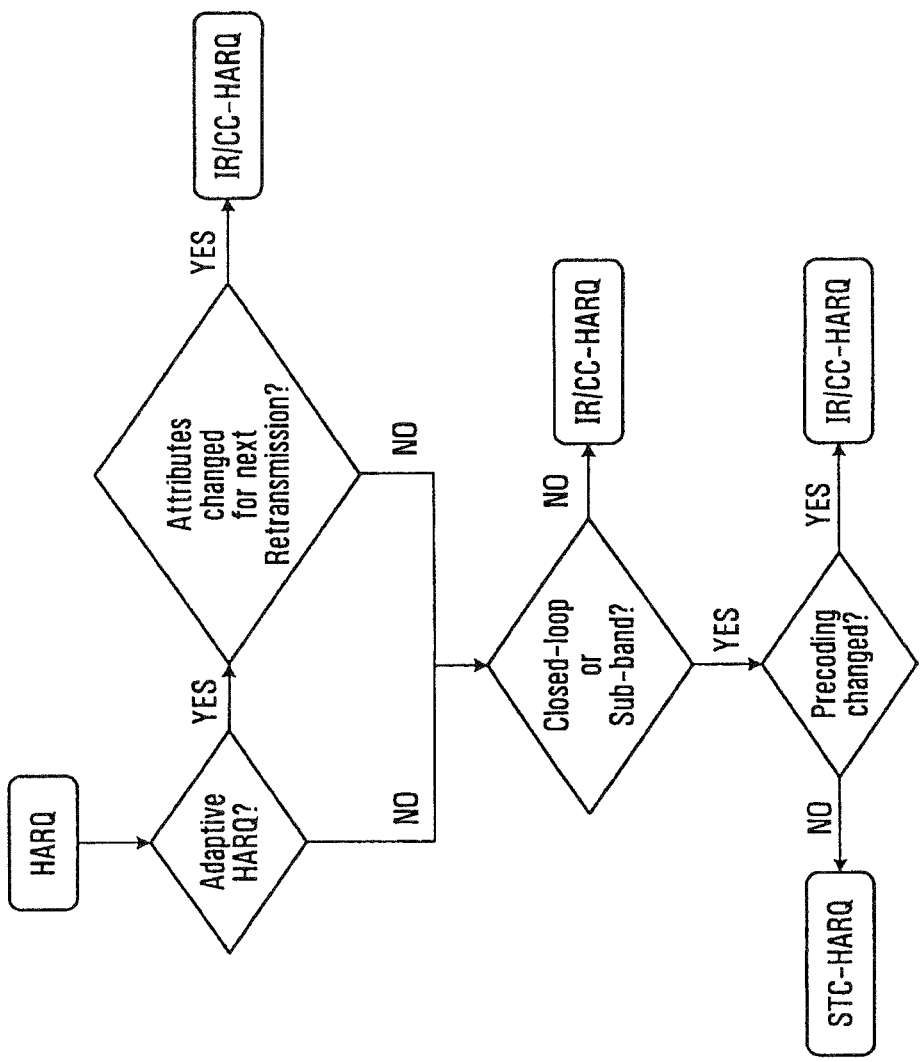
FIG. 12 is a flowchart of an adaptive HARQ procedure.

According to an embodiment of the invention, FIG. 12 provides an adaptive HARQ procedure.

While the embodiments described above refer to STC HARQ operations, more generally speaking any mapping based HARQ operation can be used without departing from the broader scope of the inventions set out in the summary and claimed. For example, antenna switching, layer switching, changing modulation signs (+ or −) or conjugates, and combinations thereof can also be used. Such mapping based HARQ operations can also be used in conjunction with pre-processing techniques such as beamforming or pre-coding to name a few. With respect to open-loop MIMO communications, these can be viewed as a special case of pre-processing where the pre-coding matrix is identical.

Figure 13:
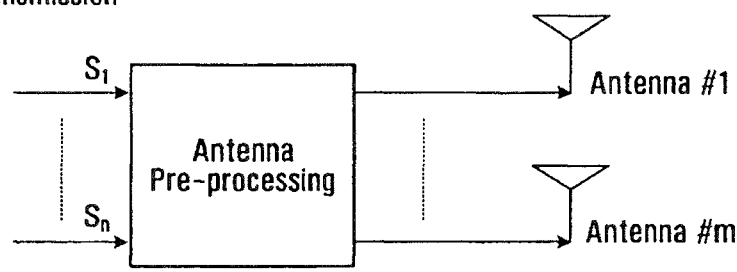
FIG. 13 is a schematic diagram of a mapping based HARQ scheme.
Figure 13:
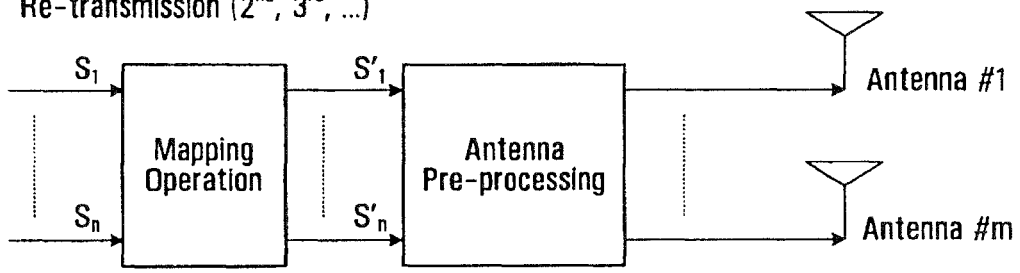

In accordance with an embodiment of the invention FIG. 13 shows a mapping based HARQ scheme.

What has been described is merely illustrative of the application of the principles of the invention. Other arrangements and methods can be implemented by those skilled in the art without departing from the spirit and scope of the present invention.

The invention claimed is:
1. A method comprising:
at a base station:
receiving one or more transmissions from a user equipment ("UE"), wherein at least one transmission of the one or more received transmissions comprises data;
measuring a network parameter associated with the UE based on the one or more received transmissions;
determining a rank of transmission scheme to be used by the UE for an uplink data transmission based the network parameter, wherein the rank of transmission scheme may be less than or equal to a maximum supported rank; and
scheduling the uplink data transmission for the UE via a transmission scheme based on the rank of transmission scheme.
2. The method of claim 1, wherein the rank is a number of spatially multiplexed data streams.
3. The method of claim 1, wherein the data is at least one of an available transmit power, a buffer status, a traffic type, or a transmission antenna capability.
4. The method of claim 1, wherein the network parameter is a Channel Quality Indicator ("CQI") or an Effective CQI.
5. The method of claim 1, wherein determining the rank of transmission scheme is further based on whether the network parameter is below a threshold.
6. The method of claim 1, wherein the transmission scheme is a MIMO transmission scheme.
7. The method of claim 1, further comprising:
scheduling a further uplink data transmission with a further UE via a further transmission scheme based on the rank of transmission scheme.
8. The method of claim 7, wherein scheduling the uplink data transmission and the further uplink data transmission comprises selecting at least one antenna from the UE and at least one antenna from the further UE.
9. A base station, comprising:
a transceiver configured to receive one or more transmissions from a user equipment ("UE"), wherein at least one transmission of the one or more received transmissions comprises data; and a processor coupled to the transceiver, wherein the processor is configured to:
measuring a network parameter associated with the UE based on the one or more received transmissions;
determine a rank of transmission scheme to be used by the UE for an uplink data transmission based the network parameter, wherein the rank of transmission scheme may be less than or equal to a maximum supported rank; and
schedule the uplink data transmission for the UE via a transmission scheme based on the rank of transmission scheme.

10. The base station of claim 9, wherein the rank is a number of spatially multiplexed data streams.

11. The base station of claim 9, wherein the data is at least one of an available transmit power, a buffer status, a traffic type, or a transmission antenna capability.

12. The base station of claim 9, wherein the network parameter is a Channel Quality Indicator ("CQI") or an Effective CQI.

13. The base station of claim 9, wherein determining the rank of transmission scheme is further based on whether the network parameter is below a threshold.

14. The base station of claim 9, wherein the transmission scheme is a MIMO transmission scheme.

15. The base station of claim 9, wherein the processor is further configured to:
schedule a further uplink data transmission with a further UE via a further transmission scheme based on the rank of transmission scheme.

16. The base station of claim 15, wherein scheduling the uplink data transmission and the further uplink data transmission comprises selecting at least one antenna from the UE and at least one antenna from the further UE.

17. A device, comprising:
circuitry to receiving one or more transmissions from a user equipment ("UE"), wherein at least one transmission of the one or more received transmissions comprises data;
circuitry to measure a network parameter associated with the UE based on the one or more received transmissions;
circuitry to determine a rank of transmission scheme to be used by the UE for an uplink data transmission based on the network parameter, wherein the rank of transmission scheme may be less than or equal to a maximum supported rank; and
circuitry to schedule the uplink data transmission for the UE via a transmission scheme based on the rank of transmission scheme.

18. The device of claim 17, wherein the rank is a number of spatially multiplexed data streams.

19. The device of claim 17, wherein the data is at least one of an available transmit power, a buffer status, a traffic type, or a transmission antenna capability.

20. The device of claim 17, further comprising:
circuitry to schedule a further uplink data transmission with a further UE via a further transmission scheme based on the rank of transmission scheme.

* * * * *